(12) United States Patent
Francies, III

(10) Patent No.: US 10,370,845 B2
(45) Date of Patent: Aug. 6, 2019

(54) ROTATING PIN LOCKING CONNECTOR

(71) Applicant: MAESTRO INTERNATIONAL, LLC, Lithia, FL (US)

(72) Inventor: Sidney E. Francies, III, Lithia, FL (US)

(73) Assignee: MAESTRO INTERNATIONAL, LLC, Lithia, FL (US)

( * ) Notice: Subject to any disclaimer, the term of this patent is extended or adjusted under 35 U.S.C. 154(b) by 324 days.

(21) Appl. No.: 15/452,755

(22) Filed: Mar. 8, 2017

(65) Prior Publication Data

US 2018/0258632 A1    Sep. 13, 2018

(51) Int. Cl.
*E04B 1/48* (2006.01)
*E04B 1/04* (2006.01)
*F16B 5/00* (2006.01)
*F16B 5/02* (2006.01)

(52) U.S. Cl.
CPC .............. *E04B 1/483* (2013.01); *E04B 1/043* (2013.01); *F16B 5/0088* (2013.01); *F16B 5/0225* (2013.01)

(58) Field of Classification Search
CPC ........ E04B 1/41; E04B 1/4107; E04B 1/4128; E04B 1/4114; E04B 1/4135
See application file for complete search history.

(56) References Cited

U.S. PATENT DOCUMENTS

| | | | | |
|---|---|---|---|---|
| 1,769,498 A * | 7/1930 | Downing | .............. | E04B 1/4107 |
| | | | | 248/507 |
| 2,133,134 A * | 10/1938 | Davis | .................... | E04B 1/4107 |
| | | | | 52/708 |
| 2,967,692 A * | 1/1961 | Wolar | .................... | E04B 1/4107 |
| | | | | 248/216.4 |
| 3,095,672 A * | 7/1963 | Di Tullio | .............. | E04B 1/4107 |
| | | | | 411/104 |
| 3,266,202 A * | 8/1966 | Furer | .................... | E04B 1/4107 |
| | | | | 248/323 |
| 4,040,228 A * | 8/1977 | Skubic | .................. | E04B 1/4107 |
| | | | | 411/302 |
| 4,085,556 A * | 4/1978 | Sonneville | ................ | E01B 3/32 |
| | | | | 52/223.13 |
| 4,194,333 A * | 3/1980 | Paton | .................... | E04B 1/4107 |
| | | | | 52/235 |
| 4,905,444 A * | 3/1990 | Semaan | ................ | E04B 1/4107 |
| | | | | 52/235 |

(Continued)

FOREIGN PATENT DOCUMENTS

| | | | | | |
|---|---|---|---|---|---|
| DE | 2020140067585 U1 | * | 9/2014 | .......... | E04B 1/4107 |
| EP | 3081707 A1 | * | 10/2016 | .......... | E04B 1/4107 |
| WO | WO-2011076606 A1 | * | 6/2011 | .......... | E04B 1/4107 |

*Primary Examiner* — Daniel J Wiley
(74) *Attorney, Agent, or Firm* — McGarry Bair PC

(57) ABSTRACT

A connector includes a receiver member having a hollow rectangular tube to be cast with a structure. An attachment member has a post extending with a pin extending radially through the post at a distal end. The pin is shorter than the longer rectangular dimension and longer than the shorter rectangular dimension. When the attachment member is positioned adjacent the receiver member and oriented with a longitudinal axis of the pin parallel to the longer rectangular dimension, the post can be inserted into the hollow tube and rotated to a position where the pin abuts a distal end of the hollow tube to lock the attachment member to the receiver member.

18 Claims, 23 Drawing Sheets

(56) References Cited

U.S. PATENT DOCUMENTS

| | | | | |
|---|---|---|---|---|
| 4,946,099 | A * | 8/1990 | Bratchell | E01B 9/28 |
| | | | | 238/264 |
| 5,548,939 | A * | 8/1996 | Carmical | E04B 1/4135 |
| | | | | 52/698 |
| 8,209,925 | B2 * | 7/2012 | Foley | E04B 1/2403 |
| | | | | 403/403 |
| 8,365,484 | B2 * | 2/2013 | Foley | E04B 1/4114 |
| | | | | 403/403 |
| 8,561,366 | B2 * | 10/2013 | Gasperi | E04B 2/94 |
| | | | | 52/235 |
| 9,359,756 | B2 * | 6/2016 | Hardy | E04B 1/2403 |
| 9,803,354 | B1 * | 10/2017 | Francies, III | E04B 1/4107 |
| 2002/0078657 | A1 * | 6/2002 | Zambelli | E04B 1/043 |
| | | | | 52/710 |
| 2008/0222981 | A1 * | 9/2008 | De Gobbi | E04B 1/41 |
| | | | | 52/235 |
| 2014/0250825 | A1 * | 9/2014 | Richardson | E04B 1/4107 |
| | | | | 52/710 |

* cited by examiner

ROTATING PIN LOCKING CONNECTOR

BACKGROUND OF THE INVENTION

Precast structures are commonly used in construction. For example, one of the most common materials for precasting is concrete, and precast concrete panels are typically used for floors, walls, ceilings, facings, and other features of building construction. It is also common to connect such precast structures to other precast structures, and to connect other elements to a precast structure.

Known means of such connections include affixing brackets to a concrete panel by adhesives or bolts, adapting hook and eye connectors, and embedding plates into a concrete panel at the time of casting.

SUMMARY OF THE INVENTION

In one aspect of the invention, a connector for connecting an element to a cast structure includes a receiver member having a hollow tube with a first cross sectional dimension greater than a second cross sectional dimension and a set of anchors adapted to anchor the receiver member in a cast structure as the cast structure is cast; and an attachment member having a back plate, and a support plate extending at an angle from the back plate configured to support an element to be connected the cast structure. The attachment member has a post extending from a rear surface of the back plate and a pin extending radially through the post at a distal end. The post has a length from the rear surface to the pin nominally greater than the length of the tube, and the pin is shorter than the first cross sectional dimension and longer than the second cross sectional dimension. When the attachment member is positioned adjacent the receiver member and oriented with a longitudinal axis of the pin parallel to the first cross sectional dimension, the post can be inserted into the hollow tube and rotated to a position where the pin abuts a distal end of the hollow tube to lock the attachment member to the receiver member.

In another aspect of the invention, a method of connecting an element to a cast structure includes providing a cast structure having an embedded receiver member, the receiver member having a hollow tube with a first cross sectional dimension greater than a second cross sectional dimension, and a space at a distal end of the hollow tube and providing an attachment member having a back plate, a support plate extending at an angle from the back plate, a post extending from a rear surface of the back plate, and a pin extending radially through the post at a distal end, the post having a length from the rear surface to the pin nominally greater than the length of the hollow tube, and the pin being shorter than the first cross sectional dimension and longer than the second cross sectional dimension. The attachment member is oriented with a longitudinal axis of the pin parallel to the first cross sectional dimension, and the pin is inserted into the hollow tube until the pin is in the space. The attachment member is rotated relative to the cast structure until the pin abuts the distal end of the hollow tube; and an element and the support plate are connected.

DETAILED DESCRIPTION

Figure 1:
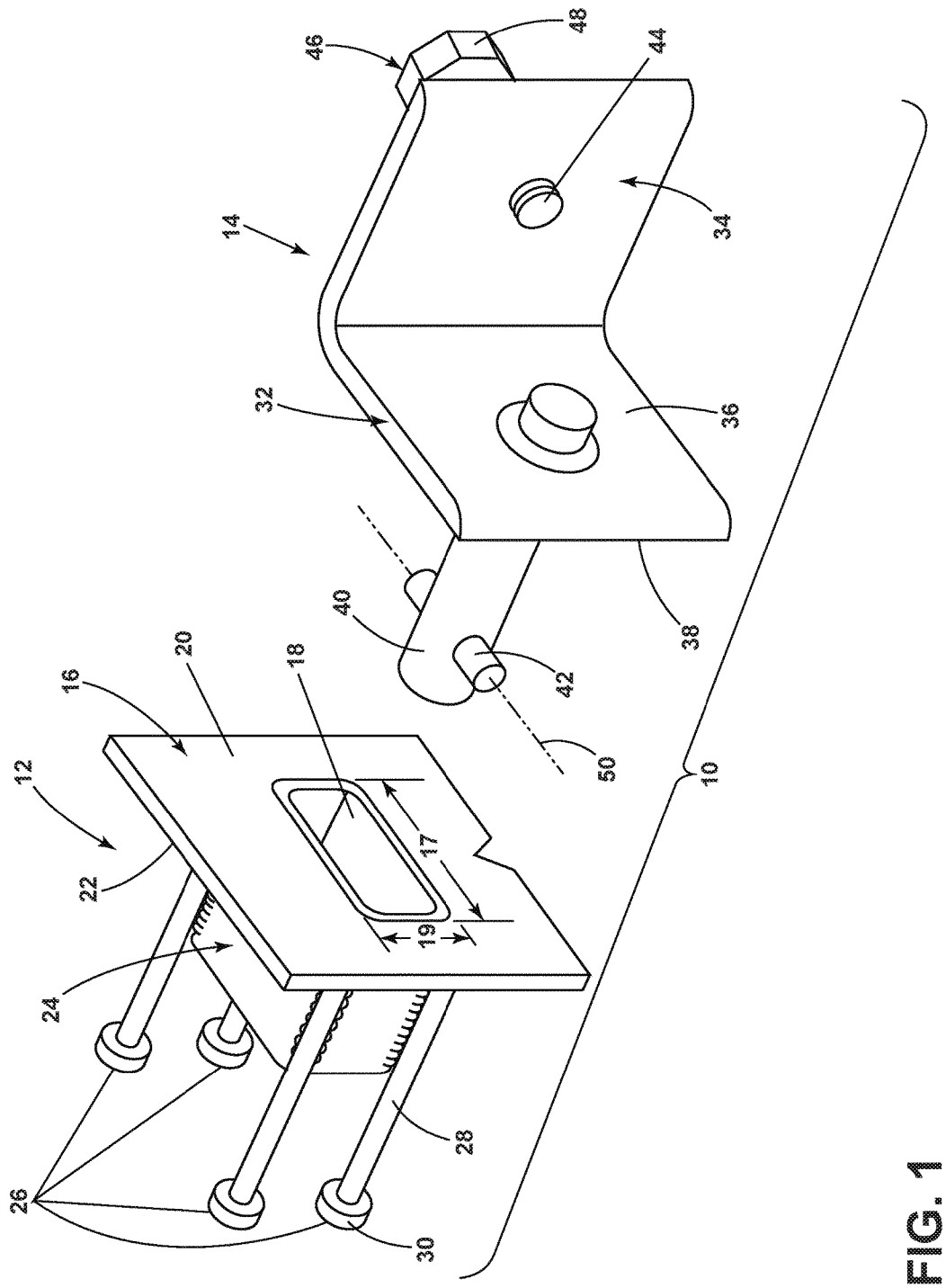
FIG. 1 is an isometric front view of a connector in accord with an embodiment of the invention prior to assembly.

Looking first a FIG. 1, a connector 10 according to an embodiment of the invention includes a receiver member 12 and an attachment member 14. The receiver member 12 includes a face plate 16 defining an aperture 18, and having a facing surface 20 and a rear surface 22, with a hollow tube 24 extending from the rear surface 22 and surrounding the aperture 18. The aperture 18 and the tube 24 are preferably rectangular, although other shapes are within the scope of the invention. It will be understood that any shape for the aperture 18 and the tube 24 is feasible so long as a first dimension 17 is longer than a second dimension 19 normal to the first dimension. For example, the aperture 18 may be wider than it is high. Similarly, the tube 24 may be wider than it is high, but it need not necessarily be the same shape as the aperture 18, or have the same dimensions.

A set of anchors 26 extends from the rear surface 22 and are preferably long enough to adequately embed and anchor the receiver member 12 in a concrete casting. Each anchor 26 may have a shaft 28 and a foot 30 to facilitate embedment. The number of anchors may vary depending in application; in the embodiment of FIG. 1 there are four, but there just as well may be two or even one if sufficient for a given application. Here the anchors 26 are welded to the tube 24 to add strength. Preferably the anchors 26 are longer than tube 24.

The attachment member 14 includes a back plate 32 and a support plate 34, here extending normally from the back plate 32, and may be attached thereto as by welding. Preferably the back plate 32 and support plate 34 are integral, formed from a single workpiece, such as by forging, forming, or stamping. As well, the support plate 34 need not extend normally from the back plate 32 but preferably at some angle depending on the application. The back plate 32 has a facing surface 36 and a rear surface 38. A post 40 extends at least from the rear surface 38, but may extend through the back plate 32 to be secured as by welding or some other secure fastening means at the facing surface 36. The post 40 is long enough to extend from the rear surface 38 a distance greater than the length of the tube 34 on the receiving member 12. A pin 42 extends radially through a distal end of the post 40. The support plate 34 has a threaded aperture 44 that receives a threaded bolt 46 carrying a bolt head 48. Preferably the longitudinal axis 50 of the pin 42 is parallel to the axis of the threaded bolt 46. In other words, the 42 extends through the post 44 in the same direction that the back plate 32 extends from the support plate 34.

Figure 2:
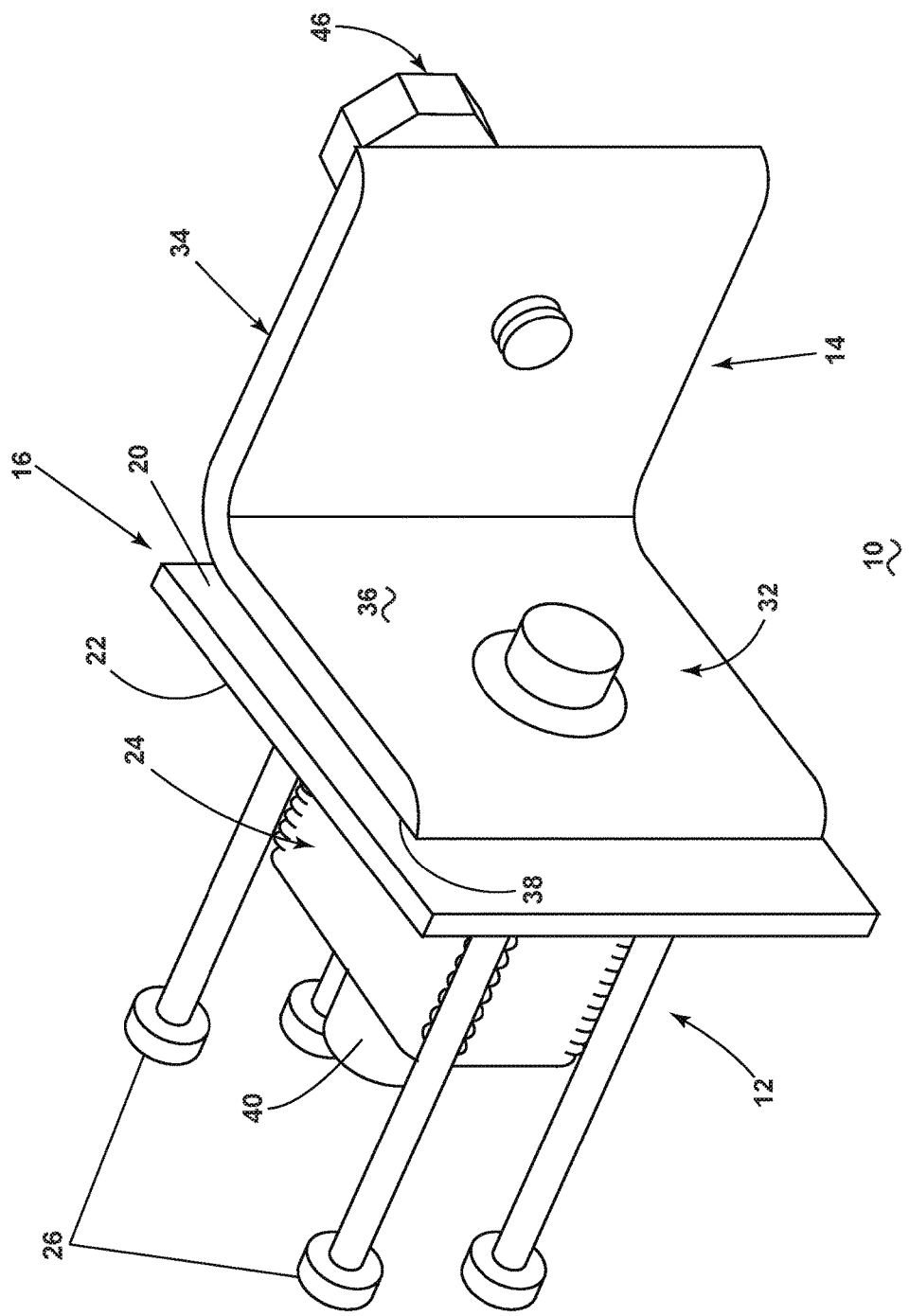
FIG. 2 is an isometric front view of the connector of FIG. 1 assembled before locking.
Figure 3:
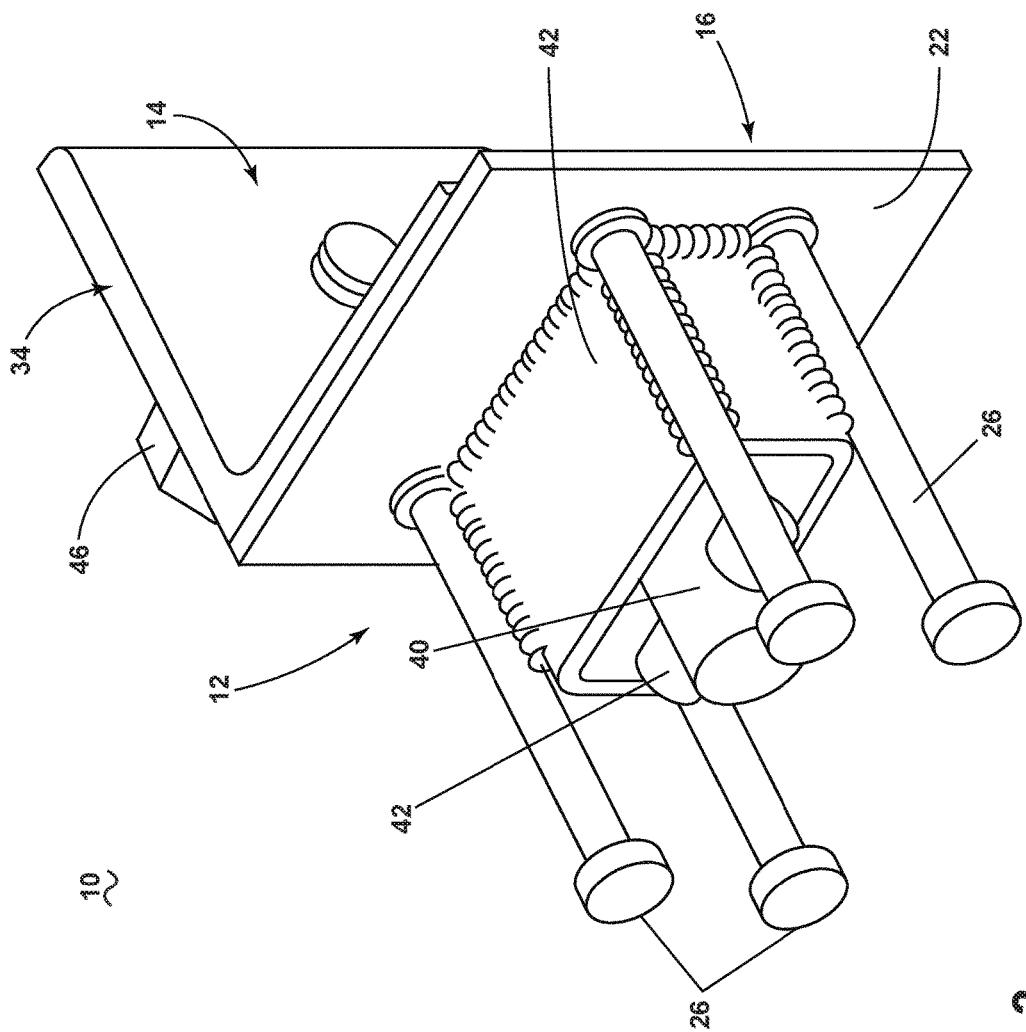
FIG. 3 is an isometric rear view of the connector in the state of FIG. 2.

Looking also at FIGS. 2 and 3, one can see that when the attachment member 14 is oriented so that the longitudinal axis 50 of the pin 42 is parallel to the first dimension 17 of the aperture 18 and the tube 24 of the receiver member 12, the post 40 and pin 42 can be received in the aperture 18 and through the tube 24 until the rear surface 38 of the back plate 32 of the attachment member 14 abuts the facing surface 20 of the face plate 16 of the receiver member 12. The post 42 will belong enough so that the pin 42 is exposed at the distal end 52 of the tube 24.

Figure 4:
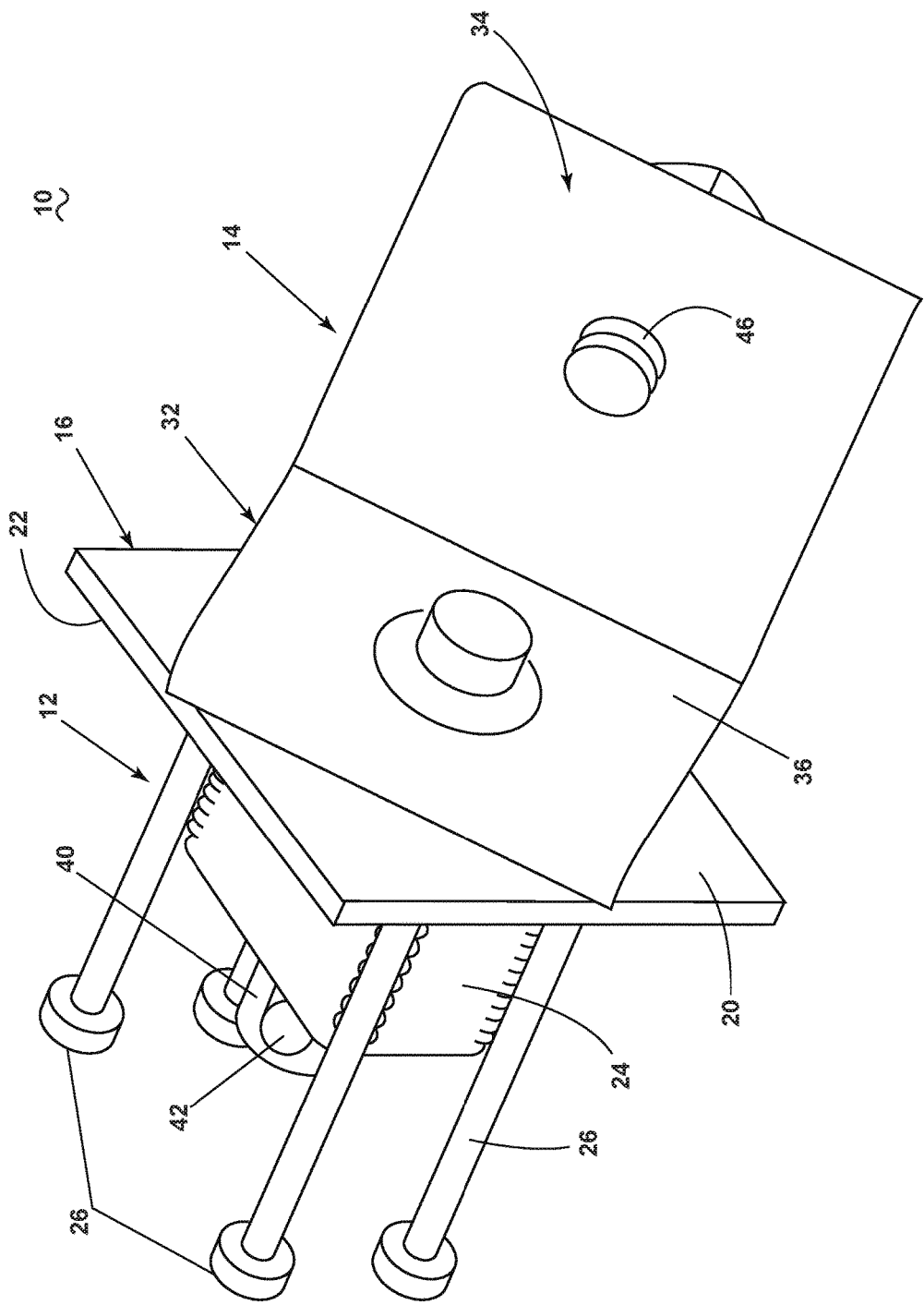
FIG. 4 is an isometric front view of the connector of FIGS. 1 and 2 with an attachment member partly rotated.
Figure 5:
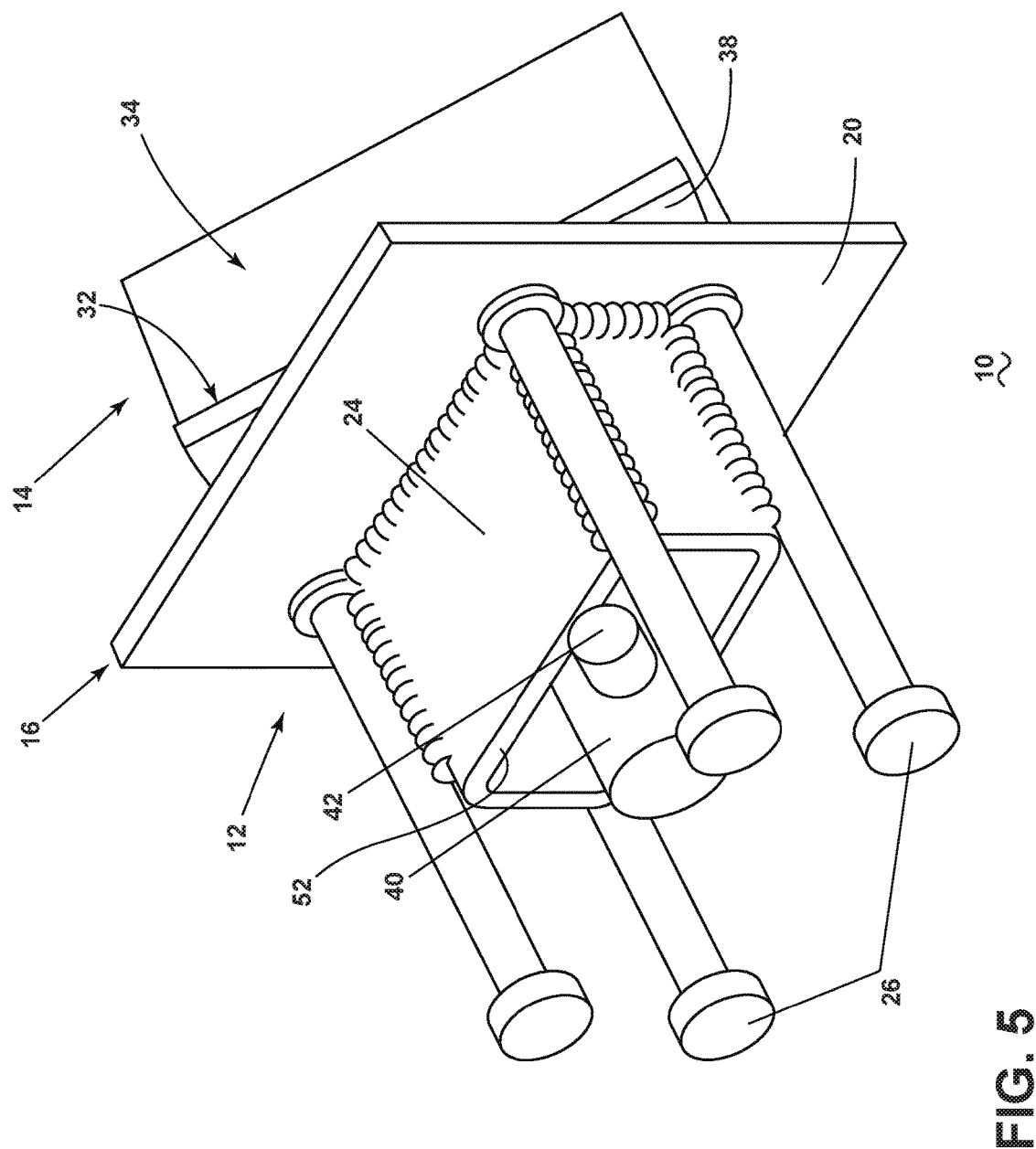
FIG. 5 is an isometric rear view of the connector of in the state of FIG. 4.
Figure 6:
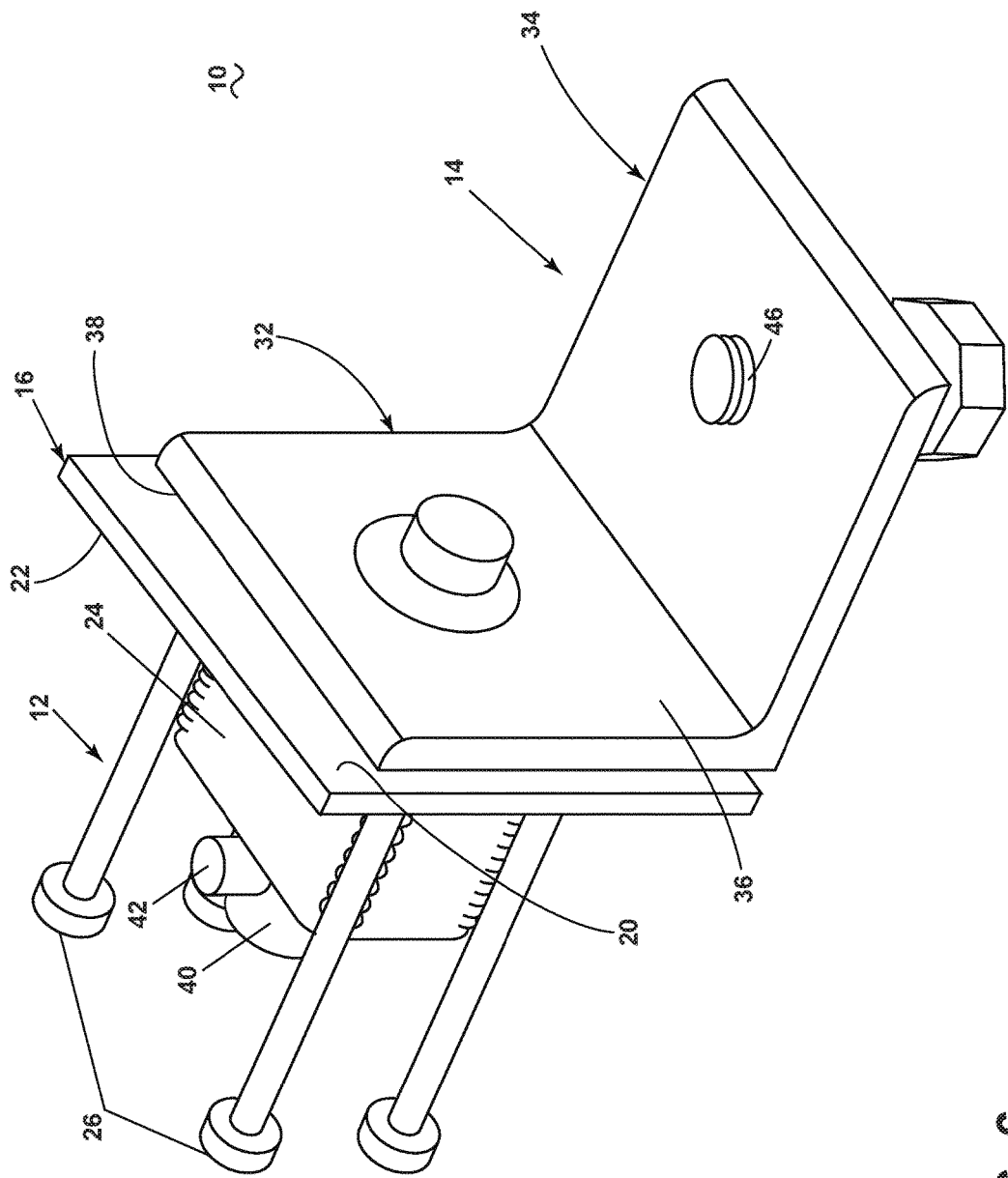
FIG. 6 is an isometric front view of the connector of FIGS. 1 and 2 with the attachment member fully rotated.

Looking now at FIGS. 4 and 5, one can lock the attachment member 14 to the receiver member 12 by rotating the attachment member 14 relative to the receiver member 12. Such rotation causes the post 40 and the pin 42 carried thereby to also rotate, which rotation continues until the pin 42 engages or at least achieves a position to interfere with the distal end 52 of the tube 24. Such interference prevents the attachment member 14 from being withdrawn from the receiver member 12. Although not shown, either the pin 42 or the distal end 52 can be dimensioned to have an interference fit with the other to aid in locking the attachment member 14 relative to the receiver member 12. Further it will be understood that the attachment member 14 can be retained the partly rotated position if desired as show in FIGS. 4 and 5. Or further rotation may move the attachment member 14 to a full rotation where the longitudinal axis 50 is parallel to the second dimension 19 as shown in FIG. 6. In any case of partial or full rotation, either the pin 42 or the distal end 50 may have detents and/or projections, respectively, which can provide stops at predetermined rotational positions.

Figure 7:
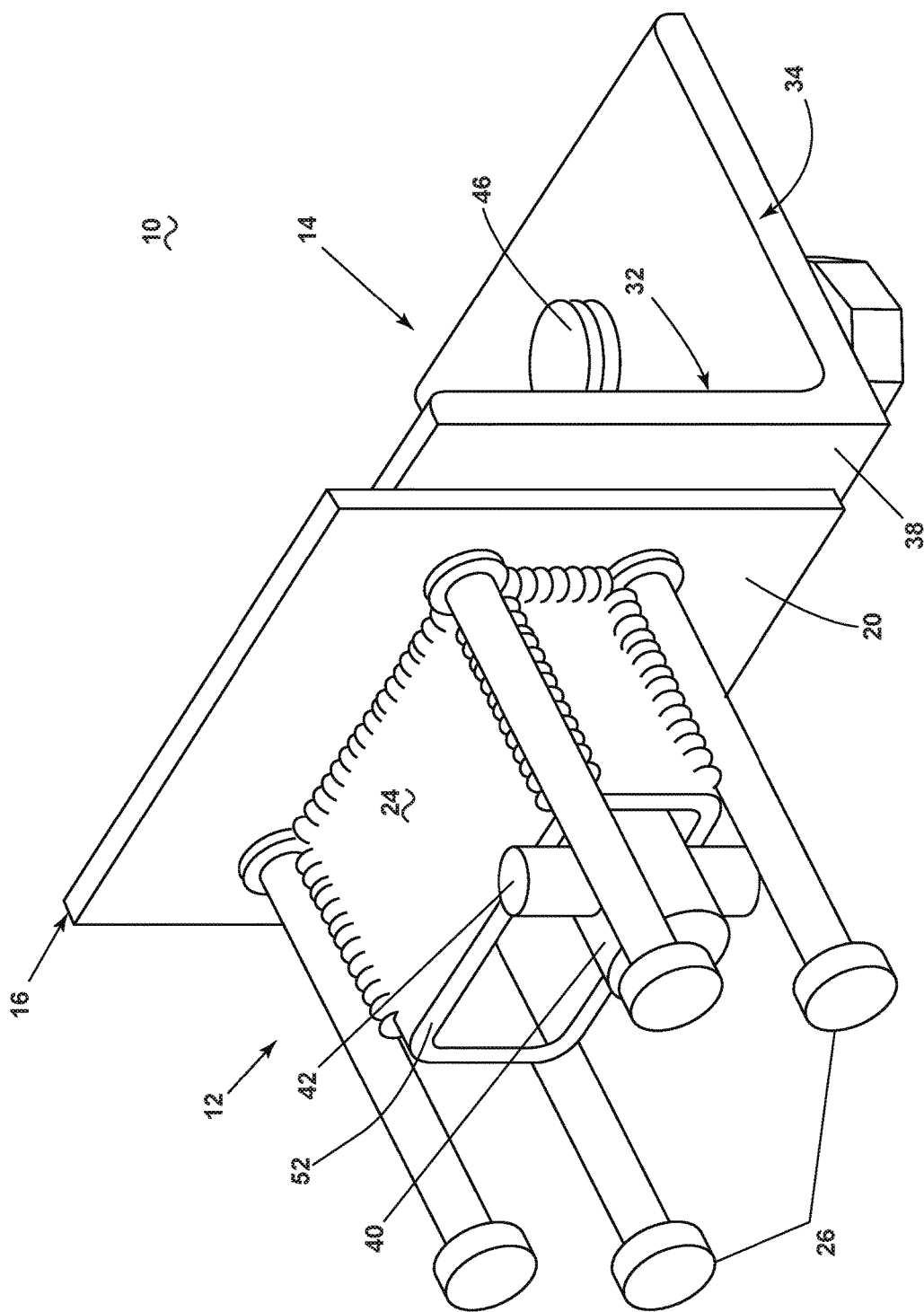
FIG. 7 is an isometric rear view of the connector of FIG. 6 with the attachment member laterally disposed in one direction.
Figure 8:
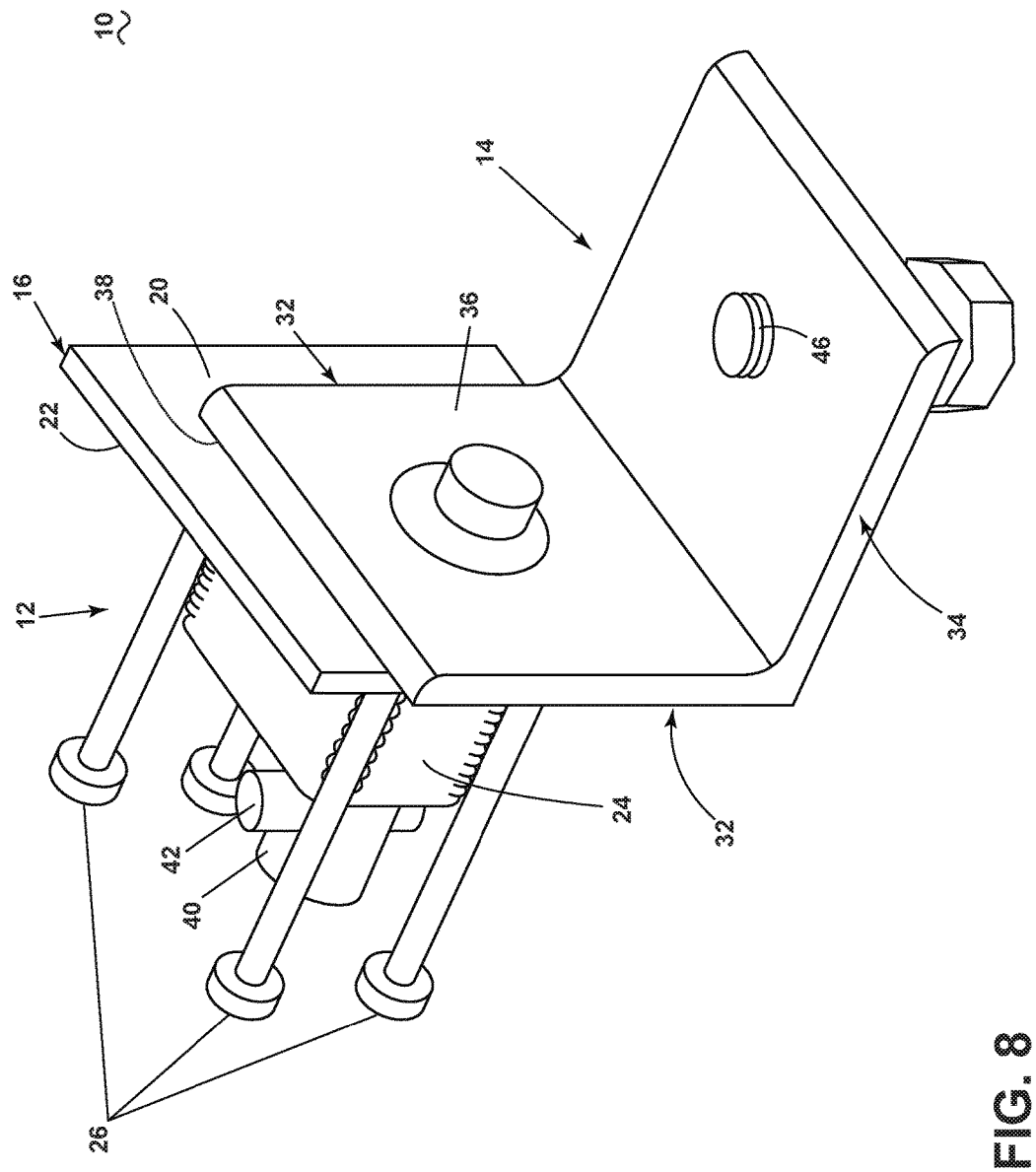
FIG. 8 is an isometric front view of the connector of FIG. 6 with the attachment member laterally disposed in the one direction.
Figure 9:
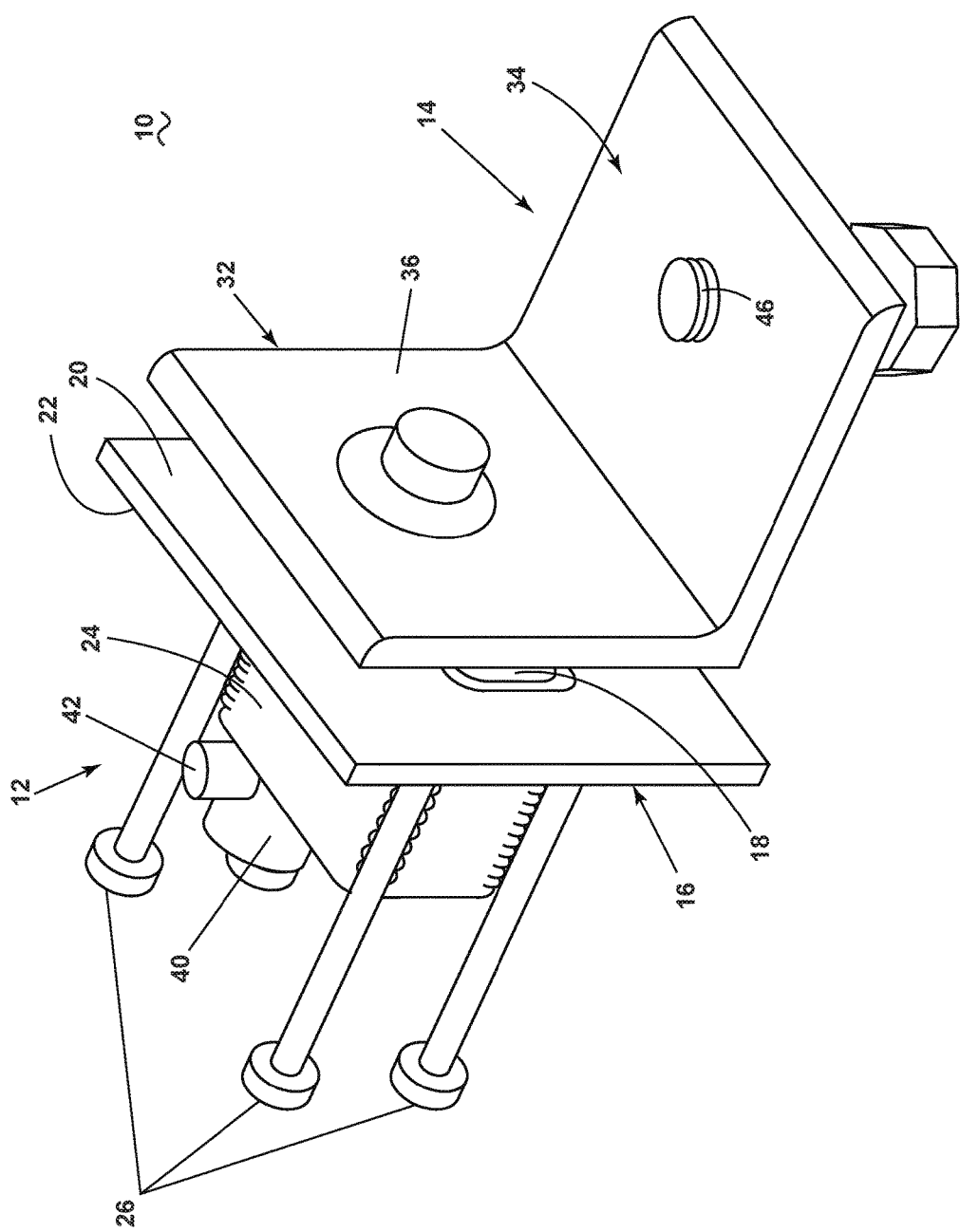
FIG. 9 is an isometric front view of the connector of FIG. 6 with the attachment member laterally disposed in another direction.
Figure 10:
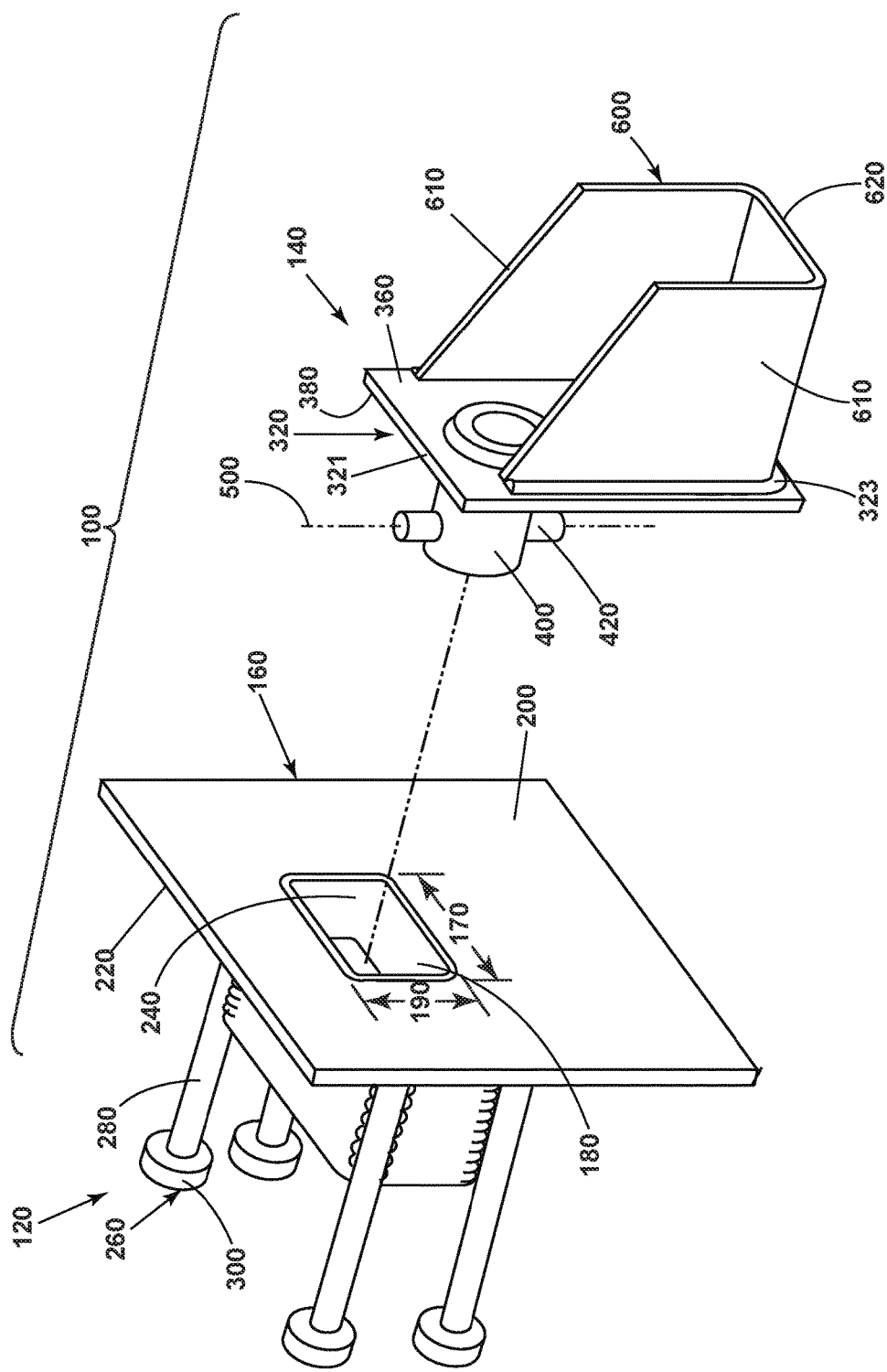
FIG. 10 is an isometric front view of a connector in accord with another embodiment of the invention prior to assembly.
Figure 11:
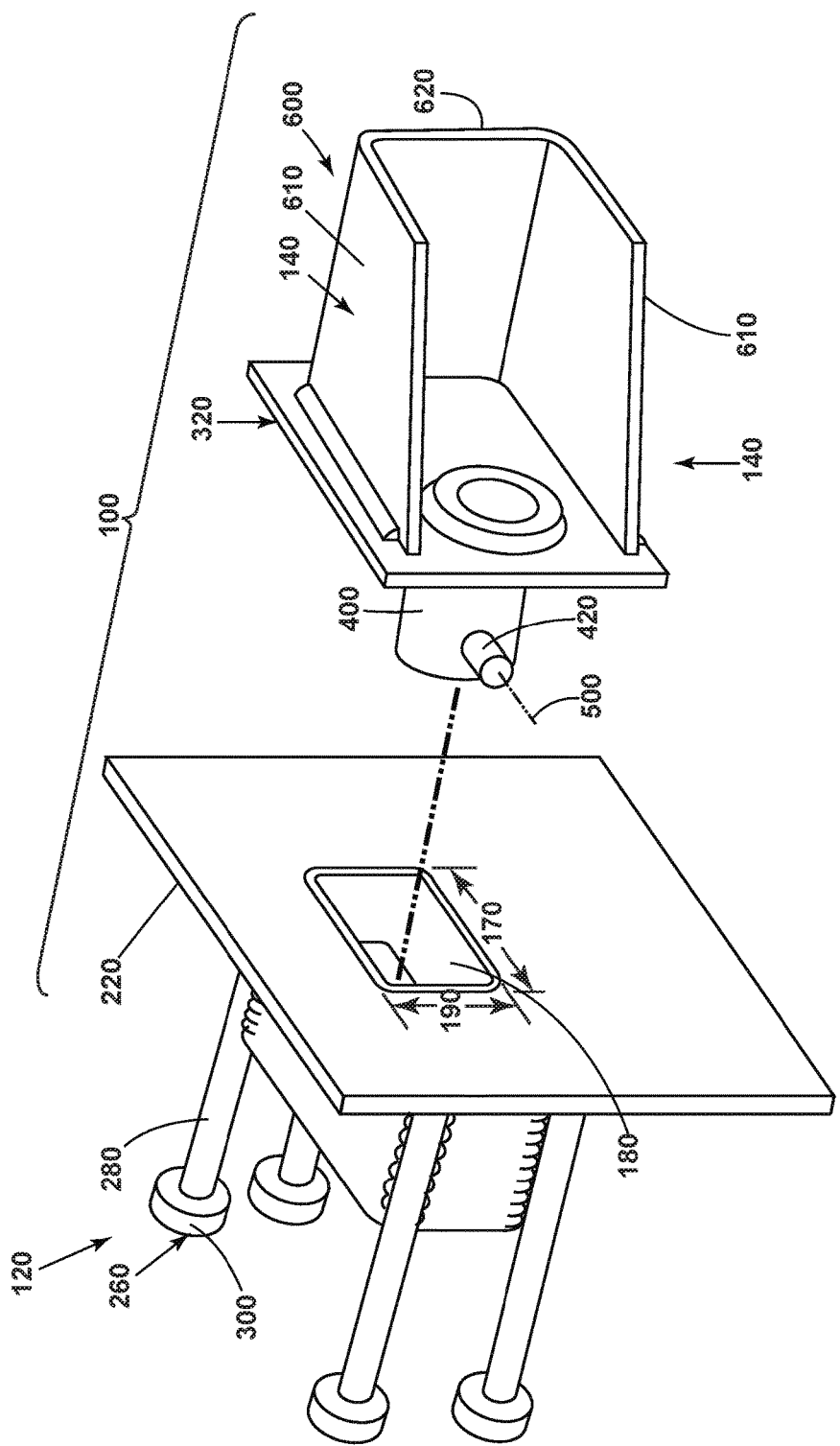
FIG. 11 is an isometric front view of the connector of FIG. 10 with an attachment member rotated prior to assembly.
Figure 12:
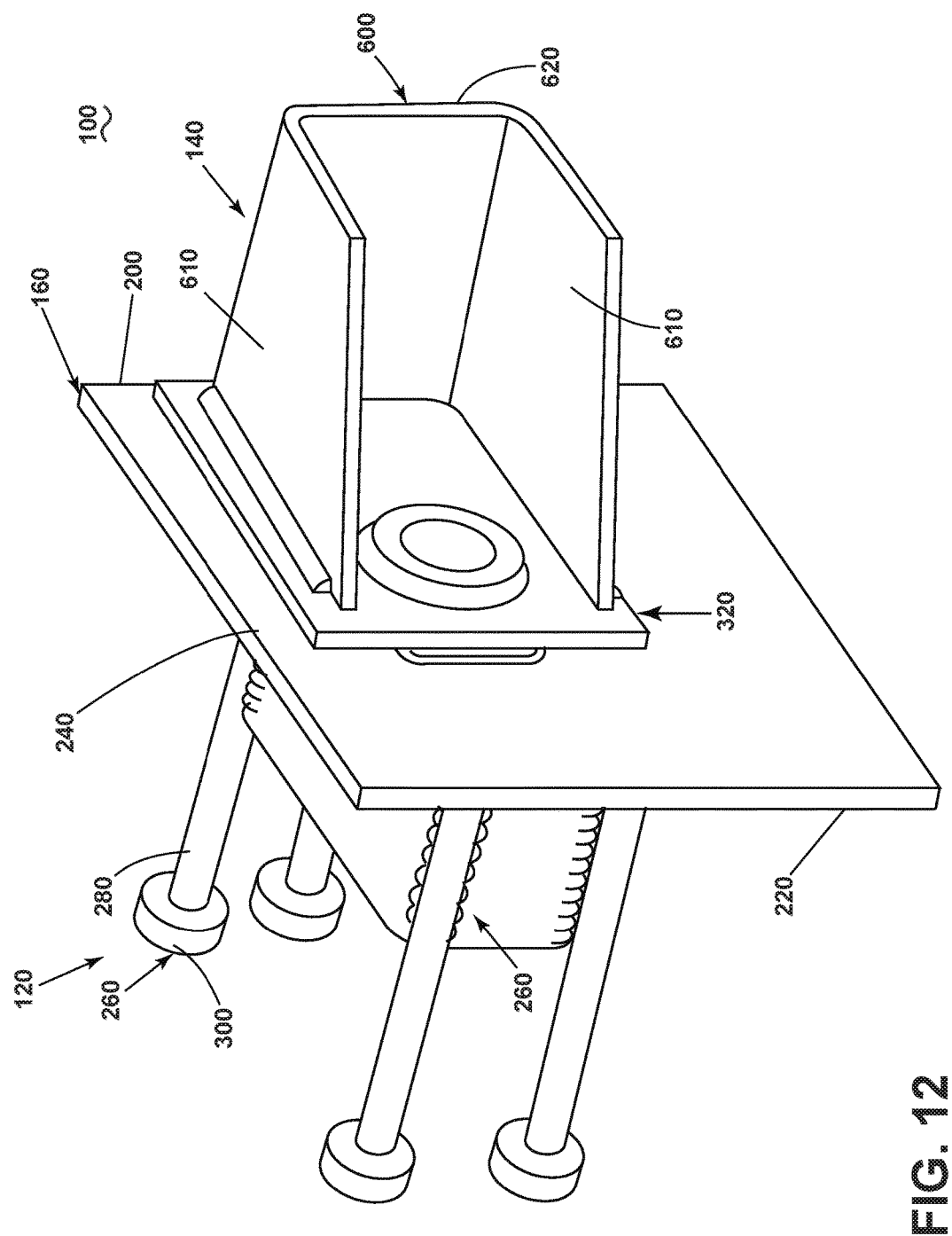
FIG. 12 is an isometric front view of the connector of FIGS. 10 and 11 assembled before locking.

Looking also at FIGS. 7-9, the first dimension 17 is preferably such that the post 40 can be positioned at one end or the other of the tube 34. Consequently, the attachment member 14 can be positioned laterally relative to the receiver member 12. It will be apparent that the inventive design provides great flexibility in orienting the attachment member 14 relative to the receiver member 12 embedded in a concrete panel.

FIGS. 10-15 illustrate another embodiment of a connector 100 according to the invention. The connector 100 includes a receiver member 120 and an attachment member 140. The receiver member 120 includes a face plate 160 defining an aperture 180, and having a facing surface 200 and a rear surface 220, with a hollow tube 240 extending from the rear surface 220 and surrounding the aperture 180. The aperture 180 and the tube 240 are preferably rectangular, although other shapes are within the scope of the invention. It will be understood that any shape for the aperture 180 and the tube 240 is feasible so long as a first dimension 170 is longer than a second dimension 190 normal to the first dimension. For example, the aperture 180 may be wider than it is high. Similarly, the tube 240 may be wider than it his high, but it need not necessarily be the same shape as the aperture 180, or have the same dimensions.

A set of anchors 260 extends from the rear surface 220 and are preferably long enough to adequately embed and anchor the receiver member 120 in a concrete casting. Each anchor 260 may have a shaft 280 and a foot 300 to facilitate embedment. The number of anchors may vary depending in application; in the embodiment of FIG. 10 there are two, but there just as well may be more than two or even one as needed for a given application. Here the anchors 260 are not attached to the tube 240, but may be so attached as by welding to add strength. Preferably the anchors 260 are longer than tube 240.

The attachment member 140 includes a back plate 320. The back plate 320 has a facing surface 360 and a rear surface 380. Preferably the back plate 320 is elongated between an upper end 321 and a lower end 323. A post 400 extends at least from the rear surface 380, but may extend through the back plate 320 to be secured as by welding or some other secure fastening means. Preferably the post 400 is secured to the back plate 320 at the upper end 321 thereof. The post 400 is long enough to extend from the rear surface 380 a distance greater than the length of the tube 240 on the receiving member 120. A pin 420 extends radially through a distal end of the post 400, with a longitudinal axis 500 in the same direction as the elongation of the back plate 320.

A saddle 600 extends from the facing surface 360. The saddle 600 comprises side walls 610 spaced from each other and connected by a web 620, preferably near the lower end 323 of the back plate 320. Looking at FIGS. 11 and 12, one can see that when the attachment member 140 is oriented so that the longitudinal axis 500 of the pin 420 is parallel to the first dimension 170 of the aperture 180 and the tube 240 of the receiver member 120, the post 400 and pin 420 can be received in the aperture 180 and through the tube 240 until the rear surface 380 of the back plate 320 of the attachment member 140 abuts the facing surface 200 of the face plate 160 of the receiver member 120. The post 420 will belong enough so that the pin 420 is exposed at the distal end 520 of the tube 240.

Figure 13:
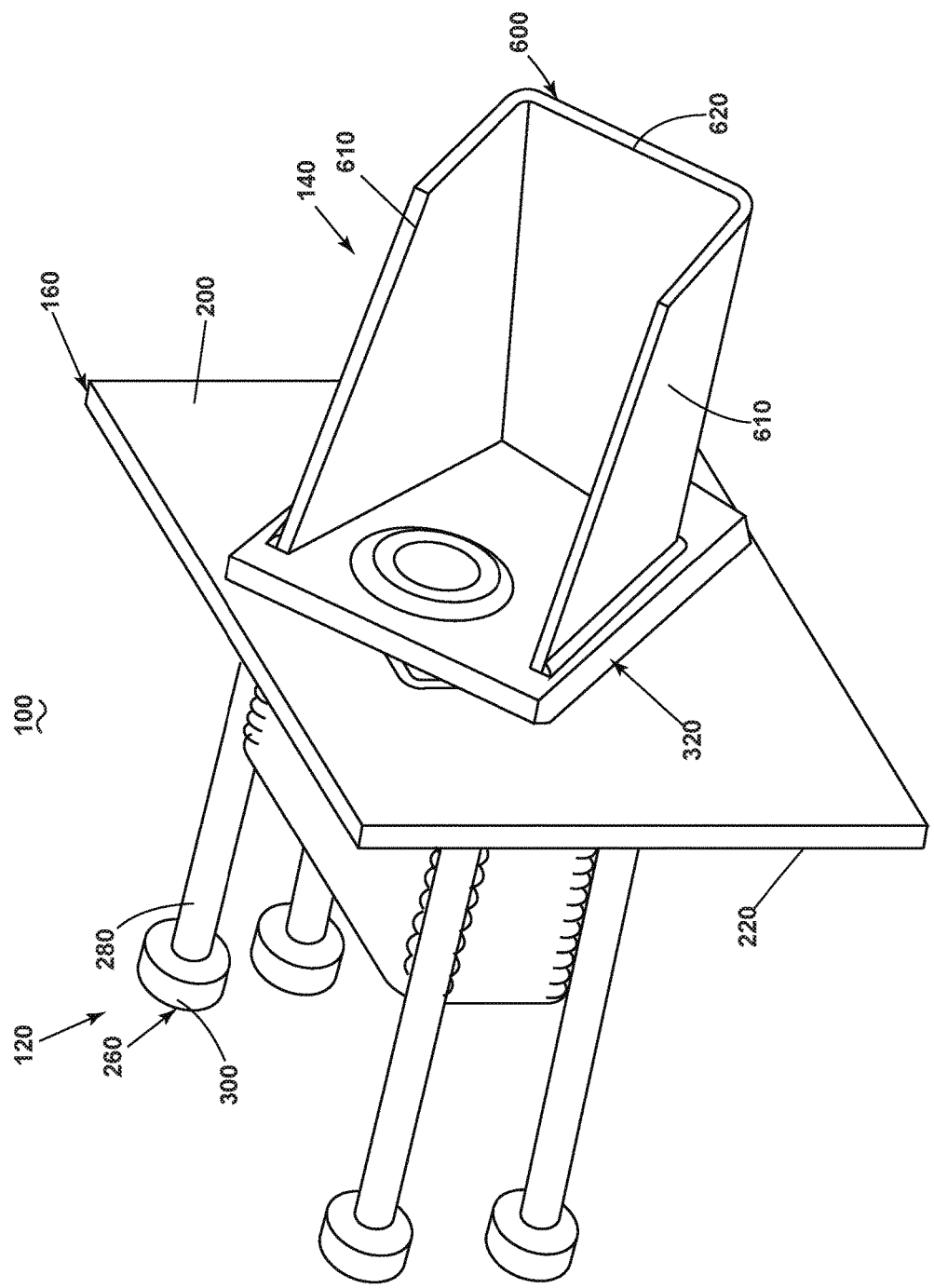
FIG. 13 is an isometric front view of the connector of FIGS. 10 and 11 with the attachment member partly rotated.
Figure 14:
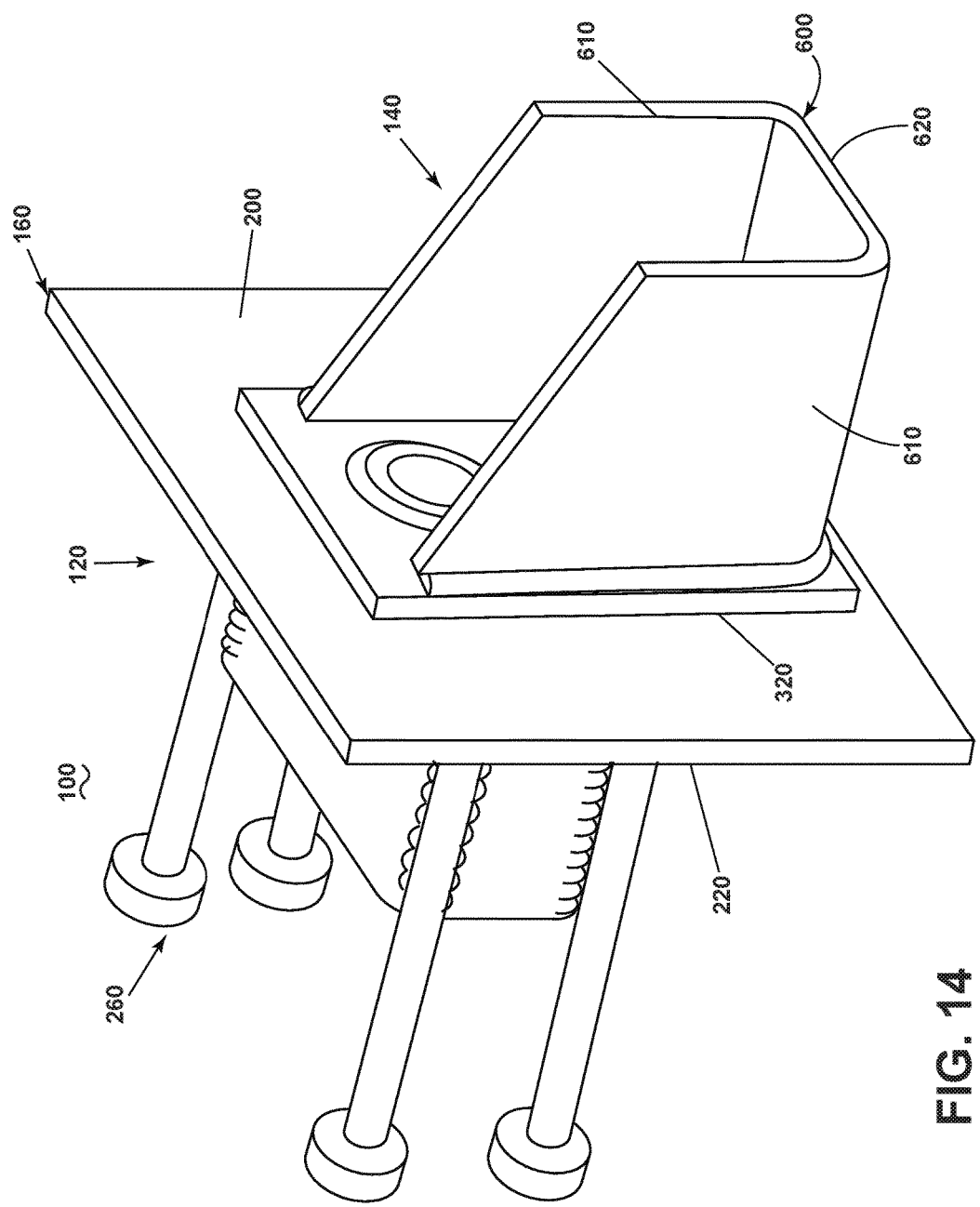
FIG. 14 is an isometric front view of the connector of FIGS. 10 and 11 with the attachment member fully rotated.
Figure 15:
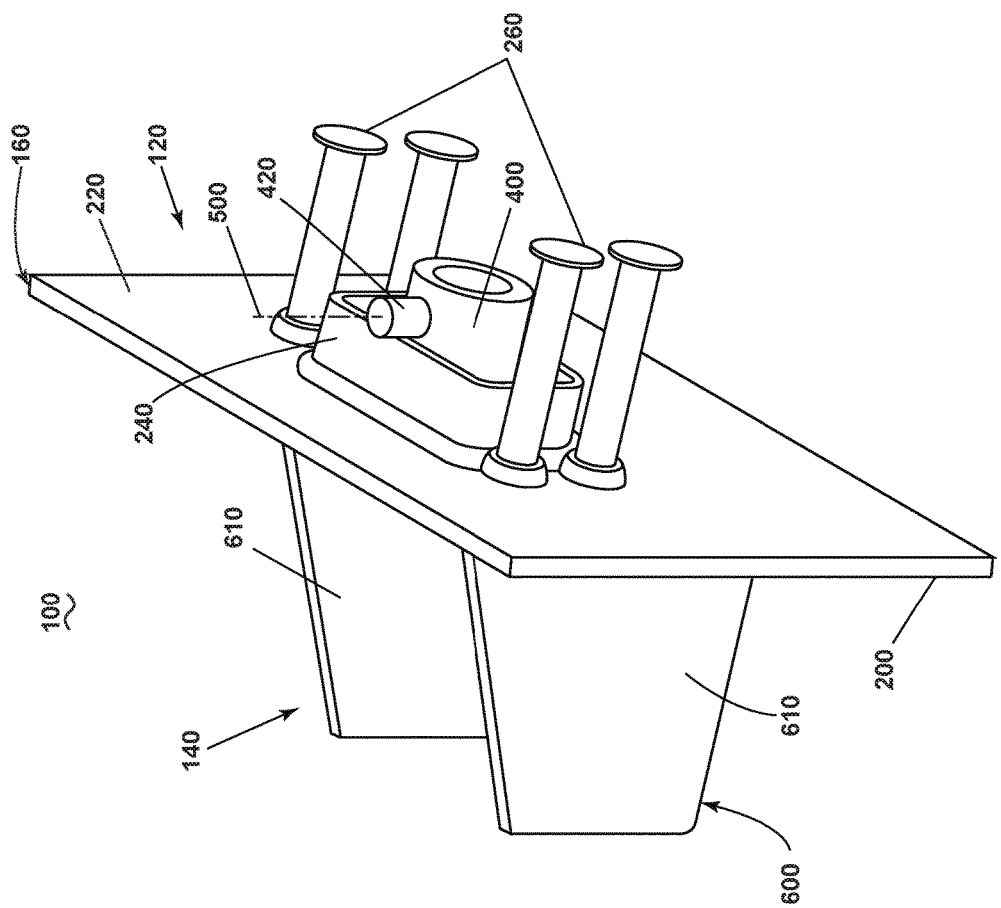
FIG. 15 is an isometric rear view of the connector in the state of FIG. 14.
Figure 16A:
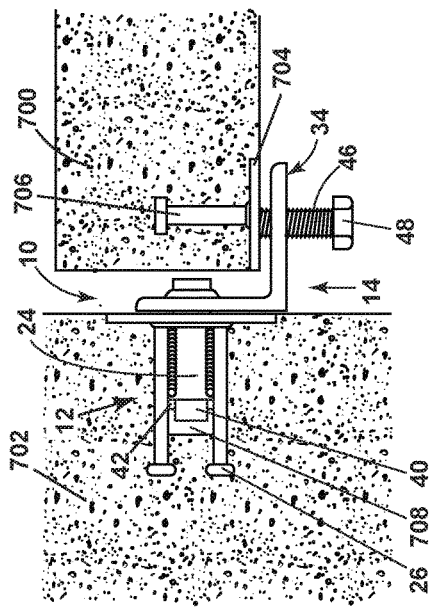
FIGS. 16(A)-16(E) are cross sectional views of concrete panels connected to each other by a connector in accord with an embodiment of the invention in various configurations.
Figure 16B:
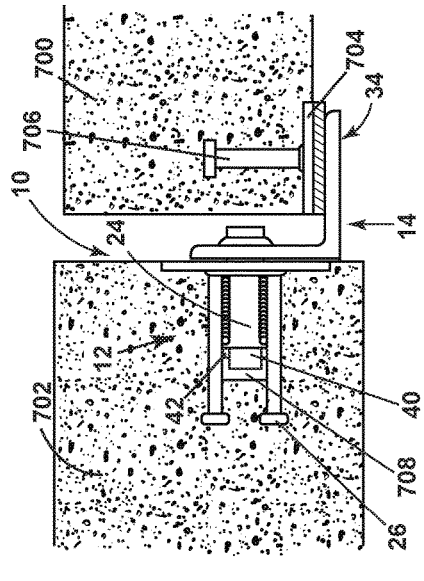
Figure 16C:
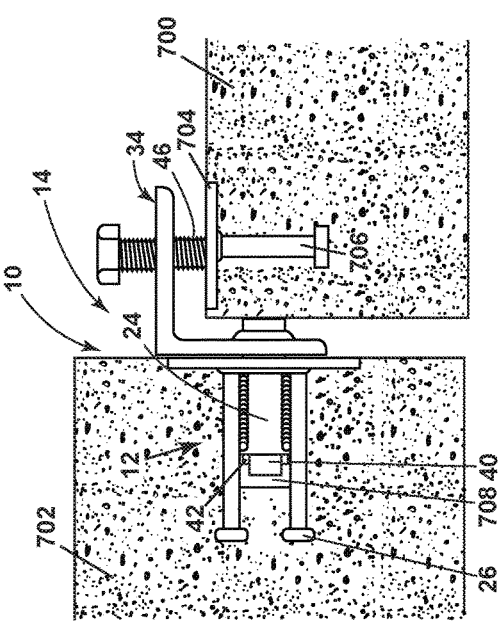
Figure 16D:
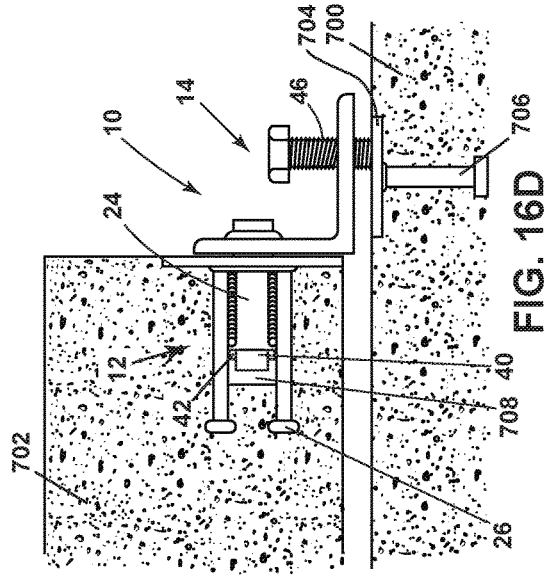
Figure 16E:
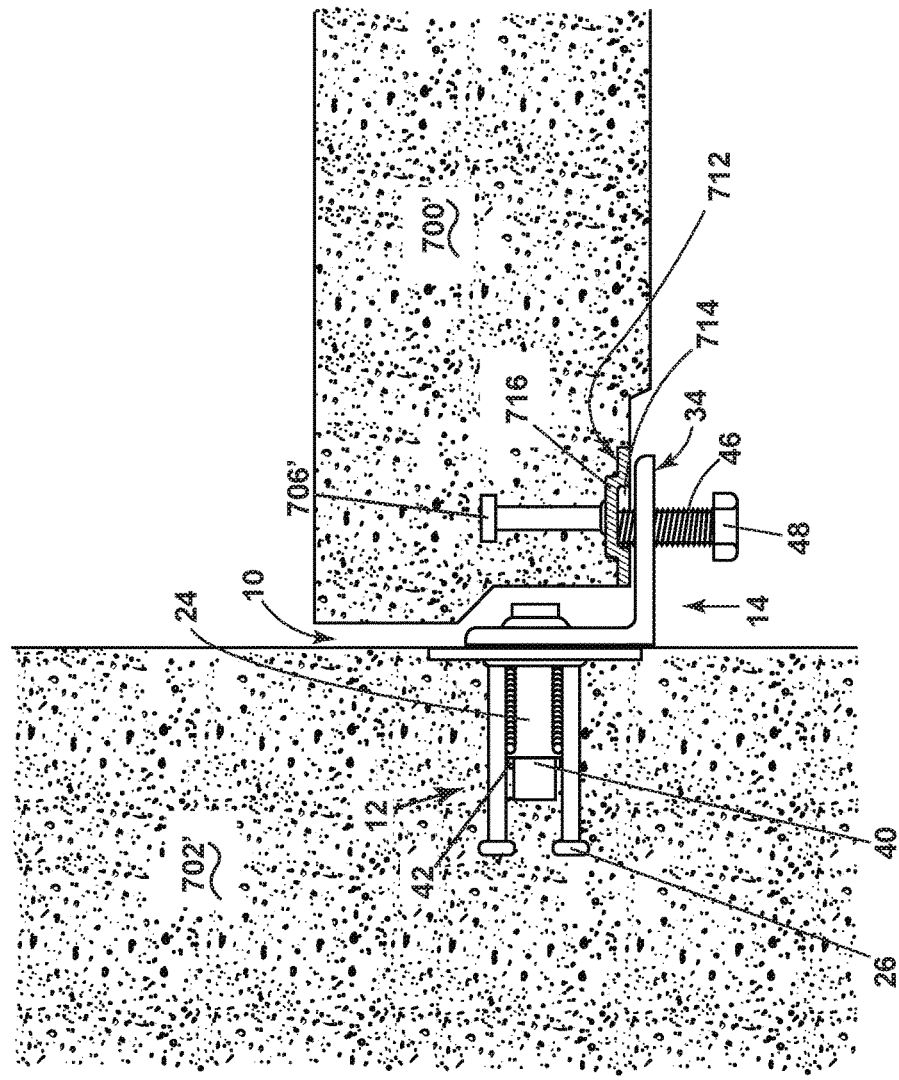
Figure 17:
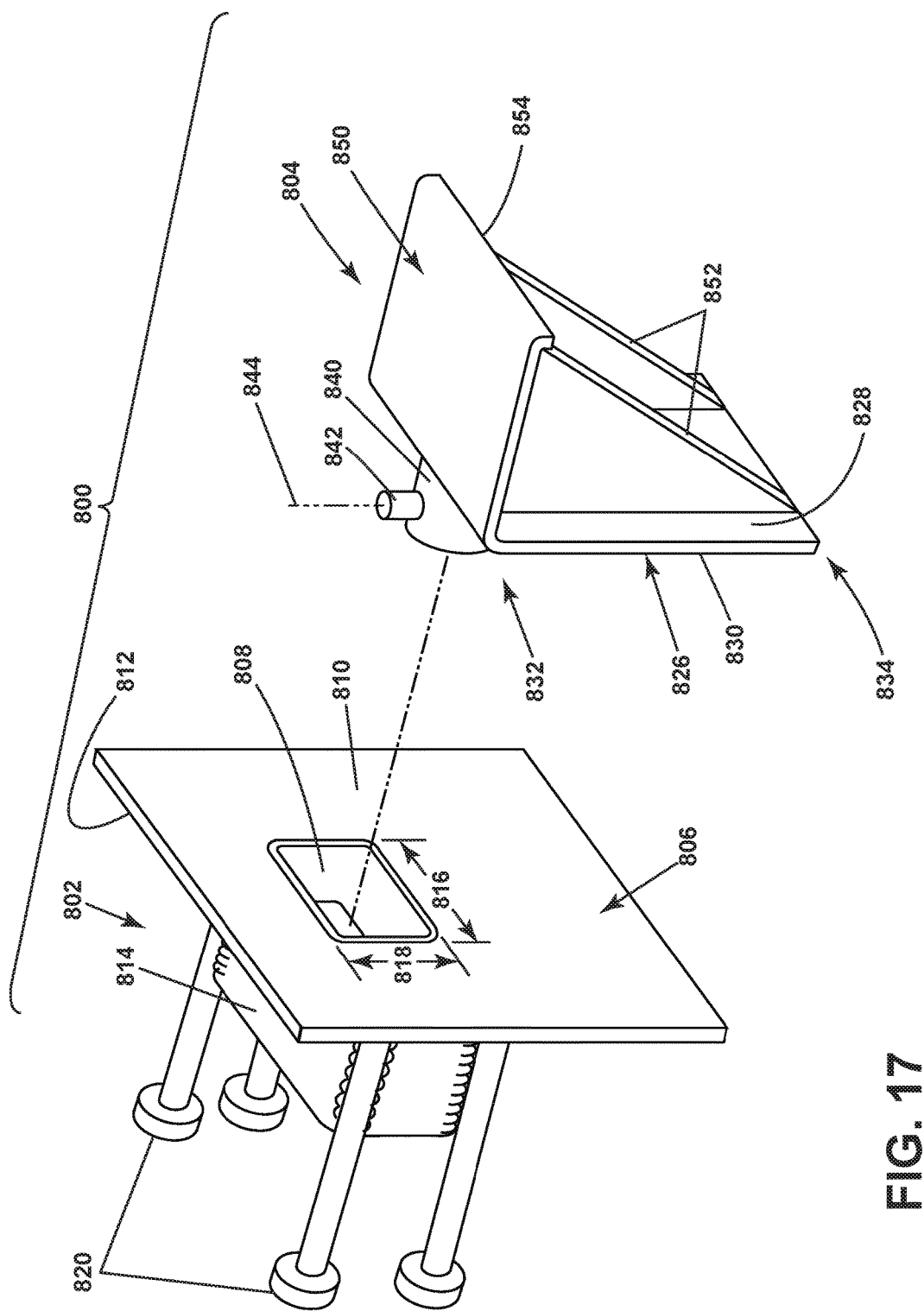
FIG. 17 an isometric front view of a connector in accord with another embodiment of the invention prior to assembly.
Figure 18:
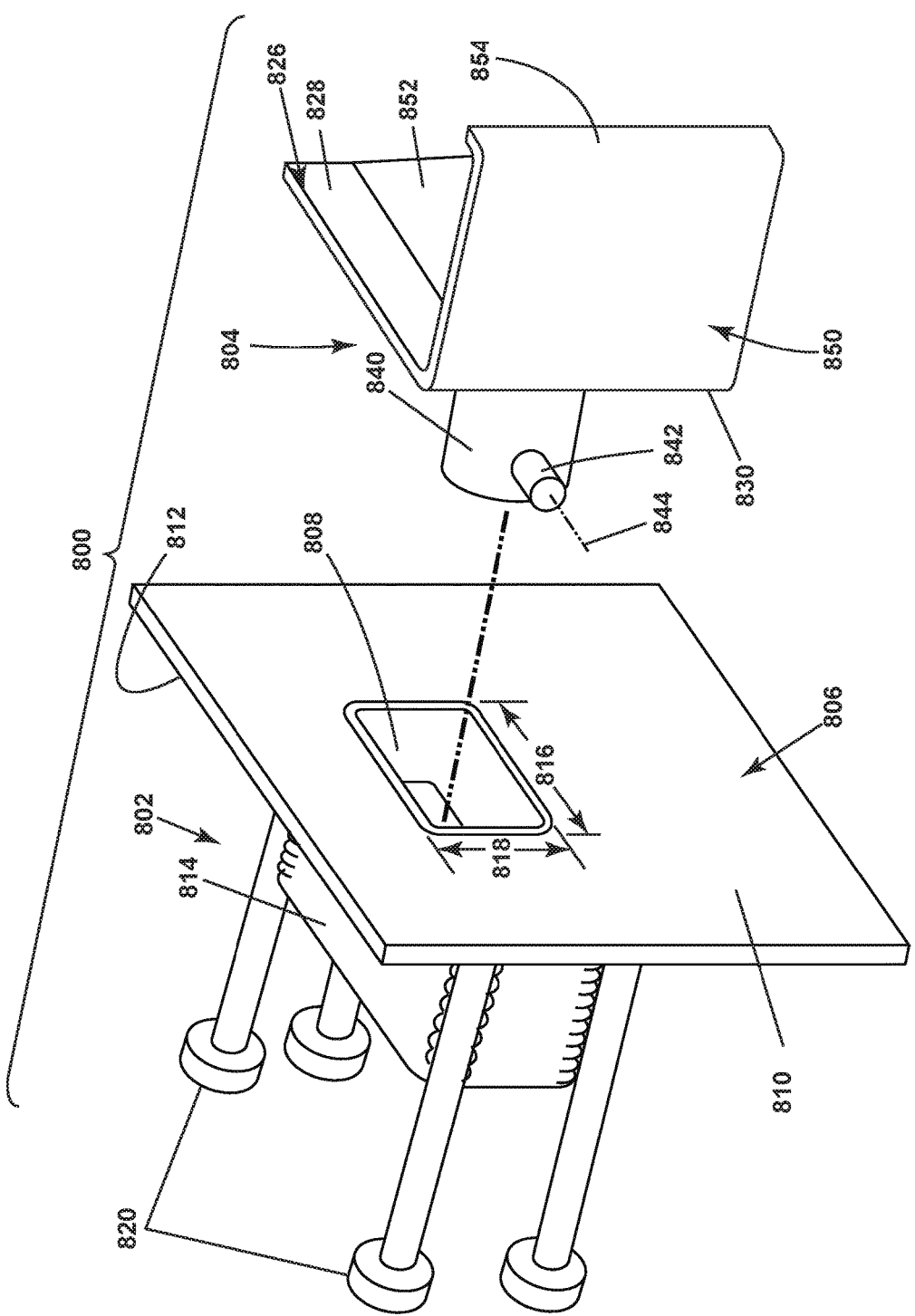
FIG. 18 is an isometric front view of the connector of FIG. 17 with an attachment member rotated prior to assembly.
Figure 19:
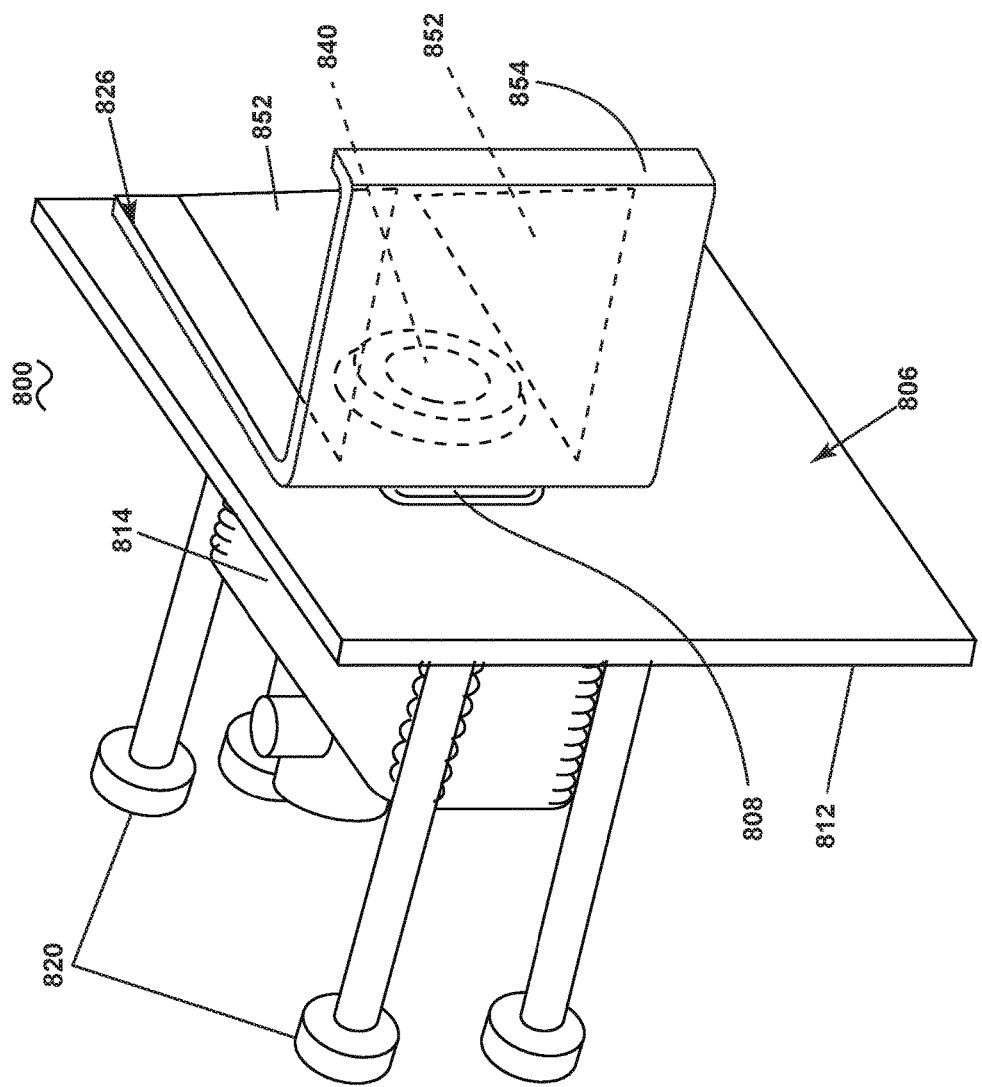
FIG. 19 is an isometric front view of the connector of FIGS. 17 and 18 assembled before locking.

In FIG. 13, one can lock the attachment member 140 to the receiver member 120 by rotating the attachment member 140 relative to the receiver member 120. Such rotation causes the post 400 and the pin 420 carried thereby to also rotate, which rotation continues until the pin 420 engages or at least achieves a position to interfere with the distal end 520 of the tube 240. Such interference prevents the attachment member 140 from being withdrawn from the receiver member 120. Although not shown, either the pin 420 or the distal end 520 can be dimensioned to have an interference fit with the other to aid in locking the attachment member 140 relative to the receiver member 120. Further it will be understood that the attachment member 14 can be retained the partly rotated position if desired as shown in FIG. 13. Or further rotation may move the attachment member 140 to a full rotation where the longitudinal axis 500 is parallel to the second dimension 190 as shown in FIGS. 14 and 15. In any case of partial or full rotation, either the pin 420 or the distal end 520 may have detents and/or projections, respectively, which can provide stops at predetermined rotational positions.

FIG. 16 A shows a configuration where the connector 10 connects a first concrete structure 700 to a second concrete structure 702. The first concrete structure will typically be a slab and the second concrete structure will typically be wall to which the slab is affixed. The first concrete structure 700 has a face plate 704 embedded by at least one anchor 706. As discussed above, the connector 10 has the receiver member 12 embedded in the second concrete structure 702 by the anchors 26 and the tube 24, with a space 708 at the distal end 52 of the tube to permit rotation of the post 40 and the pin 42. With the attachment member 14 at full rotation, the support plate 34 is disposed horizontally, enabling the face plate 704 and the first concrete structure 700 to rest on the threaded bolt 46. It will be apparent that the level of the first concrete structure 700 relative to the second concrete structure 702 can be adjusted by rotating the bolt head 48 of the threaded bolt 46. FIG. 16 B shows a configuration similar to FIG. 16 A where the face plate 704 and the first concrete structure 700 carried thereon rests directly on the support plate 34, or on a shim on the support plate 34. It will be apparent than either case of 16 A or 16 B, further adjustment of the first concrete structure 700 laterally relative to the second concrete structure 702 is available by moving the post 42 within the aperture 18 and the tube 24.

FIG. 16 C shows a converse of the configuration in FIG. 16 A where the second concrete structure 702 is configured to rest on the first concrete structure 700. Here, the attachment member 14 is at full rotation with the support plate 34 above the receiver member 12. The threaded bolt 46 rests on the face plate 704 of the first concrete structure 700 and is adjustable to change the position of the second concrete structure 702 relative to the first concrete structure 700. Similarly, FIG. 16 D shows the attachment member 14 at full rotation with the support plate 34 below the receiver member 12. The threaded bolt 46 is reversed in the support plate 34 so that it extends downwardly to rest on the face plate 704 of the first concrete structure 700. From there it adjustable to change the position of the second concrete structure 702 relative to the first concrete structure 700.

FIG. 16 E shows a configuration where the first concrete structure 700' has a projection 710 adjacent the second concrete structure 702' to minimize any gap between them. Further, the first concrete structure 700' has a face plate 712 embedded by at least one anchor 706'. The face plate 712 has a recess 714 against which the bolt 46 bears. It will be apparent that sidewalls 716 of the recess will inhibit lateral movement of the bolt 46 and, thus, the first concrete structure 700' relative to the second concrete structure 702'

FIGS. 17-22 illustrate another embodiment of a connector 800 according to the invention. The connector 800 includes a receiver member 802 and an attachment member 804. The receiver member 802 includes a face plate 806 defining an aperture 808, and having a facing surface 810 and a rear surface 812, with a hollow tube 814 extending from the rear surface 812 and surrounding the aperture 808. The aperture 808 and the tube 814 are preferably rectangular, although other shapes are within the scope of the invention. It will be understood that any shape for the aperture 808 and the tube 814 is feasible so long as a first dimension 816 is longer than a second dimension 818 normal to the first dimension. For example, the aperture 808 may be wider than it is high.

Similarly, the tube 814 may be wider than it his high, but it need not necessarily be the same shape as the aperture 808, or have the same dimensions.

A set of anchors 820 extends from the rear surface 812 and are preferably long enough to adequately embed and anchor the receiver member 802 in a concrete casting. Each anchor 820 may have a shaft 822 and a foot 824 to facilitate embedment. The number of anchors may vary depending in application; in the embodiment of FIG. 17 there are four, but there just as well may be more or less than four as needed for a given application. Here the anchors 820 are attached to the tube 814, and may be so attached as by welding to add strength, though fixed attachment is not essential. Preferably the anchors 820 are longer than tube 814.

The attachment member 804 includes a back plate 826. The back plate 826 has a facing surface 828 and a rear surface 830. Preferably the back plate 826 is elongated between an upper end 832 and a lower end 834. A post 840 extends at least from the rear surface 830, but may extend through the back plate 826 to be secured as by welding or some other secure fastening means. Preferably the post 840 is secured to the back plate 826 at the upper end 832 thereof. The post 840 is long enough to extend from the rear surface 830 a distance greater than the length of the tube 814 on the receiving member 812. A pin 842 extends radially through a distal end of the post 840, with a longitudinal axis 844 in the same direction as the elongation of the back plate 826.

A support plate 850 extends, preferably normally, from the back plate 826, and supported by a pair of gussets 852. A terminal edge of the support plate has a downturned lip 854. Looking at FIGS. 18 and 19, one can see that when the attachment member 804 is oriented so that the longitudinal axis 844 of the pin 842 is parallel to the first dimension 816 of the aperture 808 and the tube 804 of the receiver member 802, the post 840 and pin 842 can be received in the aperture 808 and through the tube 804 until the rear surface 830 of the back plate 826 of the attachment member 804 abuts the facing surface 810 of the face plate 706 of the receiver member 802. The post 840 will belong enough so that the pin 842 is exposed at the distal end 844 of the tube 804.

Figure 20:
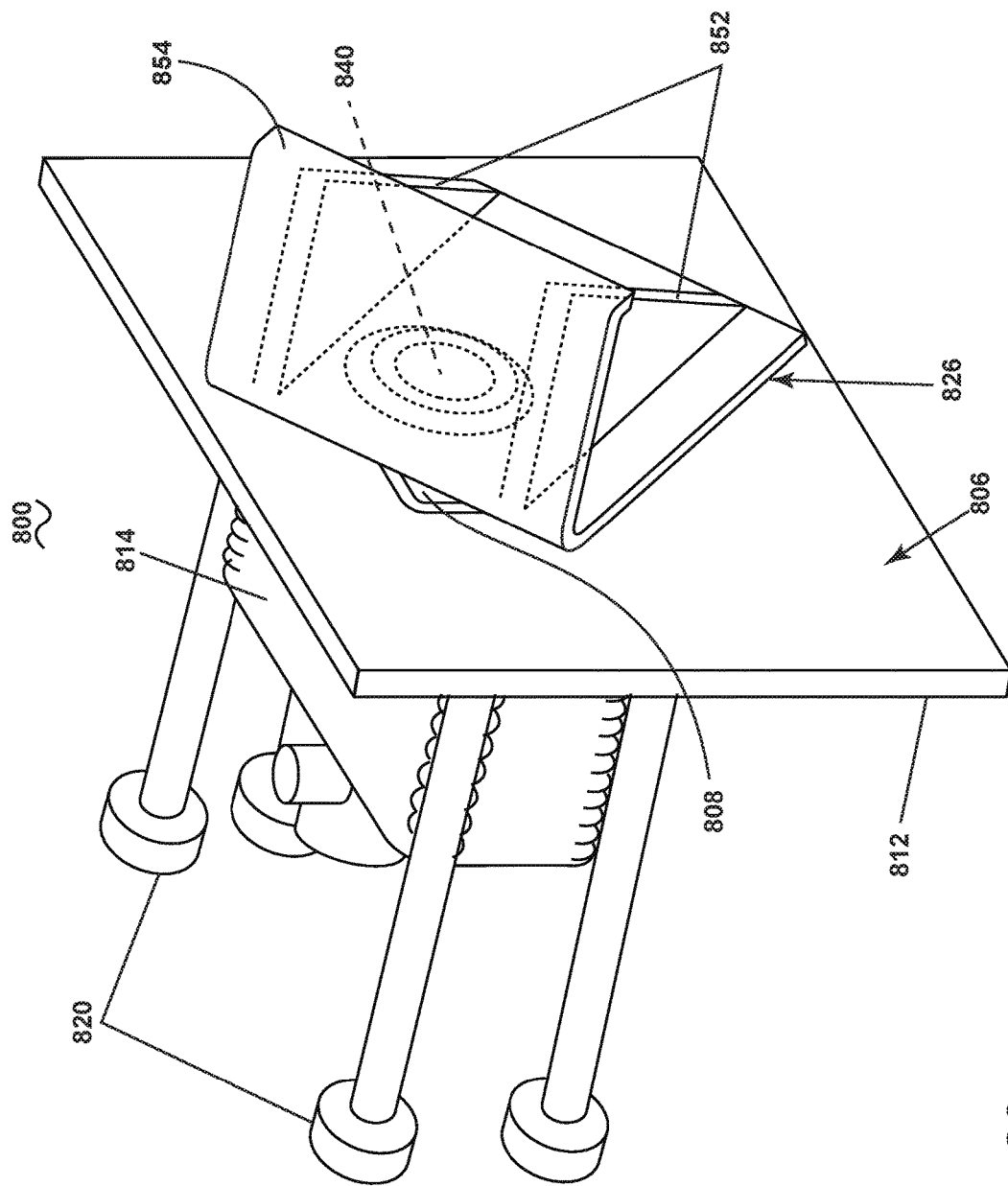
FIG. 20 is an isometric front view of the connector of FIGS. 17 and 18 with the attachment member partly rotated.
Figure 21:
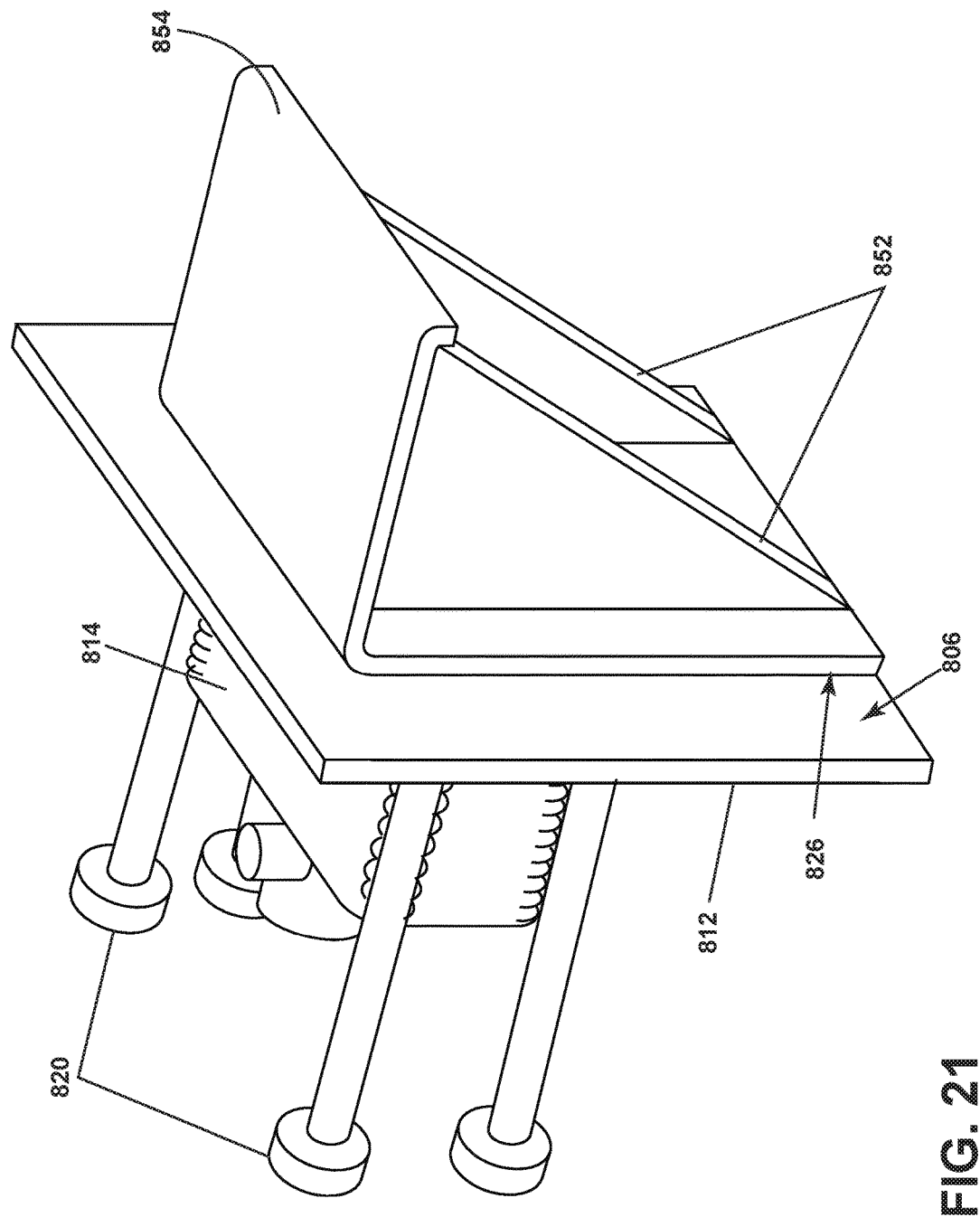
FIG. 21 is an isometric front view of the connector of FIGS. 10 and 11 with the attachment member fully rotated.
Figure 22:
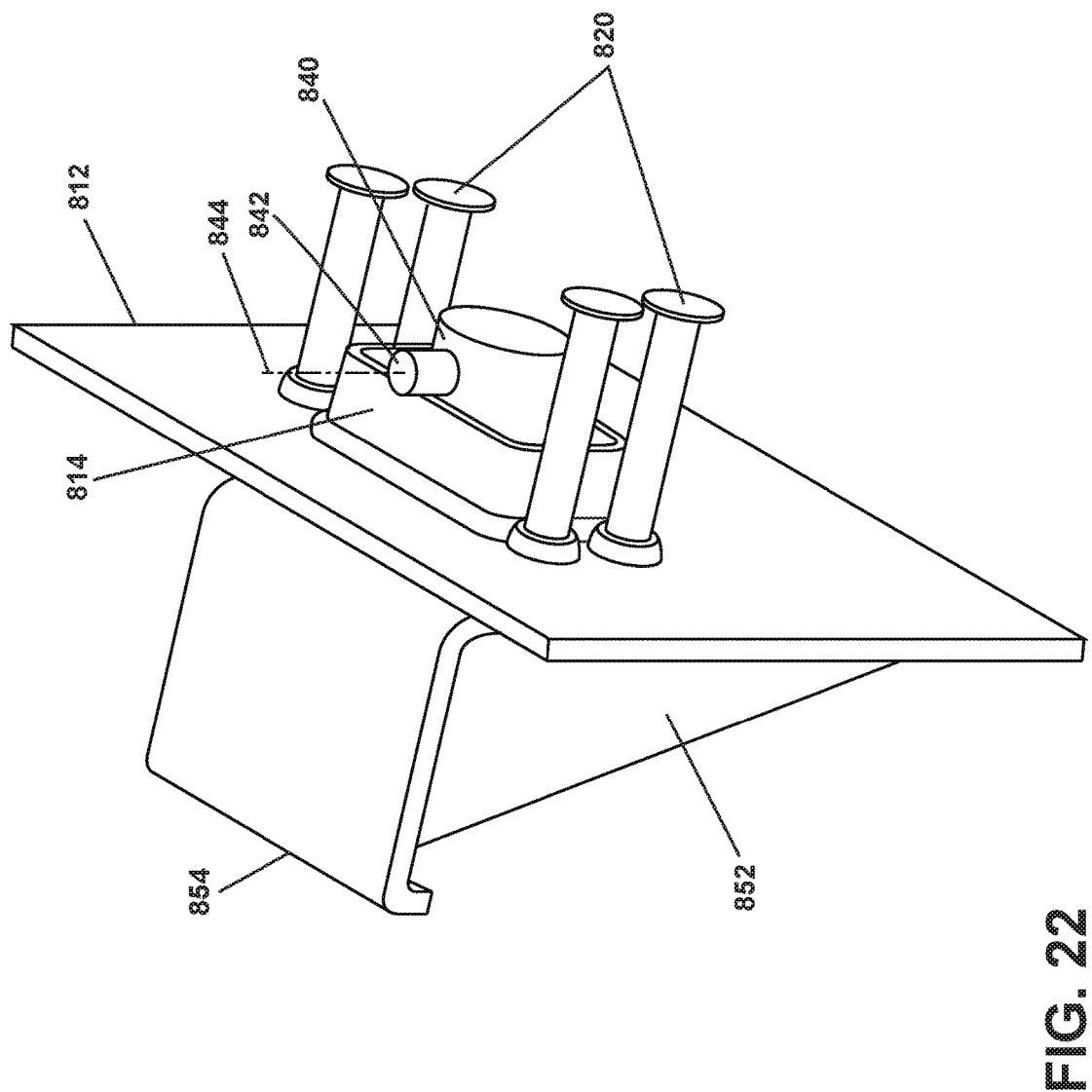
FIG. 22 is an isometric rear view of the connector in the state of FIG. 21.

In FIGS. 20-22, one can lock the attachment member 804 to the receiver member 702 by rotating the attachment member 804 relative to the receiver member 802. Such rotation causes the post 840 and the pin 842 carried thereby to also rotate, which rotation continues until the pin 842 engages or at least achieves a position to interfere with the distal end 844 of the tube 814. Such interference prevents the attachment member 804 from being withdrawn from the receiver member 802. Although not shown, either the pin 842 or the distal end 844 can be dimensioned to have an interference fit with the other to aid in locking the attachment member 804 relative to the receiver member 802. Further it will be understood that the attachment member 804 can be retained in the partly rotated position if desired as shown in FIG. 20. Or further rotation may move the attachment member 804 to a full rotation where the longitudinal axis 844 is parallel to the second dimension 818 as shown in FIGS. 21 and 22. In any case of partial or full rotation, either the pin 842 or the distal end 844 may have detents and/or projections, respectively, which can provide stops at predetermined rotational positions.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention, which is defined in the appended claims.

What is claimed is:

1. A connector for connecting an element to a cast structure, comprising:
   a receiver member having a hollow tube with a first cross sectional dimension greater than a second cross sectional dimension and a set of anchors adapted to anchor the receiver member in a cast structure as the cast structure is cast; and
   an attachment member having a back plate, and a support plate extending at an angle from the back plate configured to support an element to be connected the cast structure;
   wherein the attachment member has a post extending from a rear surface of the back plate and a pin extending radially through the post at a distal end, the post having a length from the rear surface to the pin nominally greater than the length of the tube, and the pin being shorter than the first cross sectional dimension and longer than the second cross sectional dimension so that when the attachment member is positioned adjacent the receiver member and oriented with a longitudinal axis of the pin parallel to the first cross sectional dimension, the post can be inserted into the hollow tube and rotated to a position where the pin abuts a distal end of the hollow tube to lock the attachment member to the receiver member.

2. The connector of claim 1 wherein the receiver member comprises a face plate with an aperture having at least the first cross sectional dimension and the second cross sectional dimension in registry with the hollow tube.

3. The connector of claim 1 wherein the attachment member further comprises an adjustable bolt.

4. The connector of claim 1 wherein the attachment member further comprises a saddle.

5. The connector of claim 1 wherein the set of anchors is welded to the hollow tube.

6. The connector of claim 1 wherein the set of anchors includes four anchors.

7. The connector of claim 1 wherein each anchor of the set of anchors includes a shaft longer than the hollow tube and foot at a distal end of each shaft.

8. The connector of claim 1 wherein the post extends through the back plate and is secured to the facing surface of the back plate.

9. The connector of claim 1 wherein one of the pin or the distal end of the hollow tube provides stops at predetermined rotational positions.

10. A method of connecting an element to a cast structure, the method comprising:
    providing a cast structure having an embedded receiver member, the receiver member having a hollow tube with a first cross sectional dimension greater than a second cross sectional dimension, and a space at a distal end of the hollow tube;
    providing an attachment member having a back plate, a support plate extending at an angle from the back plate, a post extending from a rear surface of the back plate, and a pin extending radially through the post at a distal end, the post having a length from the rear surface to the pin nominally greater than the length of the hollow tube, and the pin being shorter than the first cross sectional dimension and longer than the second cross sectional dimension;
    orienting the attachment member with a longitudinal axis of the pin parallel to the first cross sectional dimension;
    inserting the pin into the hollow tube until the pin is in the space;
    rotating the attachment member relative to the cast structure until the pin abuts the distal end of the hollow tube; and
    connecting an element and the support plate.

11. The method of claim 10 wherein the connecting includes mounting the element on the support plate.

12. The method of claim 10 wherein the connecting includes mounting the support plate on the element.

13. The method of claim 10 wherein the connecting includes adjusting the element relative to the support plate.

14. The method of claim 10 wherein the rotating includes rotating the attachment member relative to the cast structure about 90 degrees.

15. The method of claim 10 wherein the rotating includes rotating the attachment member relative to the cast structure less than 90 degrees.

16. The method of claim 10 wherein the element is a second cast structure.

17. The method of claim 10 wherein the cast structure is concrete.

18. The method of claim 10 wherein the attachment member includes a saddle and the connecting includes nesting the element in the saddle.

* * * * *